(12) United States Patent
Guo

(10) Patent No.: US 10,512,882 B2
(45) Date of Patent: Dec. 24, 2019

(54) DRYING AND FILTERING DEVICE

(71) Applicant: BITEMAN TECHNOLOGY CO., LTD., Shenzhen (CN)

(72) Inventor: Yinghui Guo, Shenzhen (CN)

(73) Assignee: Biteman Technology Co., Ltd., Shenzhen, Guangdong Province (CN)

( * ) Notice: Subject to any disclaimer, the term of this patent is extended or adjusted under 35 U.S.C. 154(b) by 89 days.

(21) Appl. No.: 15/743,186

(22) PCT Filed: Sep. 18, 2015

(86) PCT No.: PCT/CN2015/089947
§ 371 (c)(1),
(2) Date: Jan. 9, 2018

(87) PCT Pub. No.: WO2017/020405
PCT Pub. Date: Feb. 9, 2017

(65) Prior Publication Data
US 2019/0118135 A1   Apr. 25, 2019

(30) Foreign Application Priority Data
Jul. 31, 2015   (CN) .......................... 2015 1 0465125

(51) Int. Cl.
*B01D 50/00* (2006.01)
*B01D 59/50* (2006.01)
(Continued)

(52) U.S. Cl.
CPC ......... *B01D 53/265* (2013.01); *B01D 5/0006* (2013.01); *B01D 5/009* (2013.01)

(58) Field of Classification Search
None
See application file for complete search history.

(56) References Cited

U.S. PATENT DOCUMENTS 2,783,616 A * 3/1957 Dodge ................... F24F 5/001
62/113
3,383,087 A * 5/1968 Linssen ................. F16K 31/62
251/276

(Continued)

FOREIGN PATENT DOCUMENTS

CN        2131594 Y      5/1993
CN      201180634 Y      1/2009

OTHER PUBLICATIONS

Translation of CN201180634, accessed May 30, 2019 (Year: 2009).*

*Primary Examiner* — Amber R Orlando
*Assistant Examiner* — Phillip Y Shao
(74) *Attorney, Agent, or Firm* — Rosenberg, Klein & Lee

(57) ABSTRACT

A drying and filtering device used for drying and filtering compressed air comprises a housing (10) having a cavity (11), an upper cover (20) disposed on the roof of the housing (10), a lower cover (30) having a drainage port (31) disposed at the bottom of the housing (10), and a cooling tube (40) disposed in the housing (10). An air inlet (21) and an air outlet (22) are provided at two sides of the upper cover (20). The cavity (11) being in communication with the air inlet (21), the air outlet (22), and the drainage port (31) respectively. The cooling tube (40) is disposed in the cavity (11) and extends from a position near the upper cover (20) downward to the lower cover (30). Compressed air enters the cavity (11) from the air inlet (21) on the upper cover (20), and contacts the cooling tube (40).

10 Claims, 3 Drawing Sheets

(51) Int. Cl.
*B01D 53/26* (2006.01)
*B01D 5/00* (2006.01)

(56) References Cited

U.S. PATENT DOCUMENTS

| | | | | |
|---|---|---|---|---|
| 4,015,959 A | * | 4/1977 | Grote | B01D 53/26 55/318 |
| 4,242,110 A | * | 12/1980 | Hynes | B01D 53/265 55/490.2 |
| 4,471,836 A | * | 9/1984 | Hokanson | F28B 9/10 165/111 |
| 4,497,182 A | * | 2/1985 | Youngworth | F25D 16/00 62/151 |
| 4,522,257 A | * | 6/1985 | Wolfseder | B01D 3/008 165/111 |
| 5,230,166 A | * | 7/1993 | Deng | B01D 5/0039 165/111 |
| 5,630,865 A | * | 5/1997 | Price | B01D 53/265 55/421 |
| 5,746,791 A | * | 5/1998 | Wang | B01D 53/265 55/337 |

* cited by examiner

DRYING AND FILTERING DEVICE

CROSS REFERENCE

This application claims priority as a 371 National Phase Application of International Application PCT/CN2015/089947, filed Sep. 18, 2015, which claims the benefit of priority from Chinese Patent Application No. CN201510465125.6, filed with the Chinese patent office on Jul. 31, 2015, the entire contents of all of which are incorporated herein by reference.

TECHNICAL FIELD

The disclosure relates to a field of air drying, and more specifically to a drying and filtering device applied in the field of compressed air.

BACKGROUND

Compressed air usually contains a lot of water and saturated vapor, which are mainly removed by refrigeration dryer in tradition. In prior art drying means of the refrigeration dryer is: compressed air enters a drying pipe of the refrigeration dryer, and the drying pipe contacts a cooling pipe, so that heat exchange occurs between the compressed air in the drying pipe and the cooling pipe, thereby the saturated vapor in the compressed air condenses into water, which is removed by passing through a filtering device. However, such drying means is inefficient, has poor drying effect and high energy consumption, and additionally needs a filtering device to filter condensed water.

SUMMARY

The disclosure aims to solve the technical problems in the prior art that the refrigeration dryer is inefficient, has poor drying effect and high energy consumption, and requires a special filtering device to filter the condensed water, and provides a drying and filtering device with high drying efficiency, good drying effect, low energy consumption and capable of filtering the condensed water as well.

In a aspect, the disclosure provides a drying and filtering device used for drying and filtering compressed air, comprising:
a housing, having a cavity;
an upper cover, disposed on the roof of the housing, one side of which is provided with an air inlet, the other side of which is provided with an air outlet;
a lower cover, disposed at the bottom of the housing, and being provided with a drainage port; and
a cooling tube, disposed in the housing;
wherein the cavity is in communication with the air inlet, the air outlet and the drainage port respectively, and the cooling tube is in the cavity and extends from a position near the upper cover downward to the lower cover; and
wherein compressed air enters the cavity from the air inlet of the upper cover, and contacts the cooling tube, so that the temperature of the compressed air decreases, and saturated vapor in the compressed air condense to liquid water, which is drained through the drainage port by gravity, and dried compressed air outflows from the air outlet.

In an embodiment, the cooling tube is wound into a cylindrical helix tube having an inner cavity, in which a steel mesh is placed, and the compressed air is evenly diffused through the steel mesh.

In an embodiment, the upper cover is provided with an air-inlet cavity for communicating the cavity with the air inlet and an air-outlet cavity for communicating the cavity with the air outlet, the cylindrical helix tube is located at an intermediate position of the cavity, the inner cavity of which is aligned with the air-inlet cavity for communicating each other, and the cavity is in communication with the air-outlet cavity.

In an embodiment, the lower cover is provided with a liquid storage chamber, which is located directly below the cylindrical helix tube, and the drainage port is located below the liquid storage chamber.

In an embodiment, the upper end of the steel mesh extends into the air-inlet cavity, and the lower end of the steel mesh extends into the liquid storage cavity.

In an embodiment, a drainage valve is disposed at the drainage port, which is used for regularly draining liquid water form the liquid storage cavity.

In an embodiment, a filter is located at the outer periphery of the cooling tube, which is tubular and surrounds the cooling tube, the surface of which is provided with openings.

In an embodiment, the lower cover is further provided with a first interface cavity for accommodating an inlet end of the cooling tube and a second interface cavity for accommodating an outlet end of the cooling tube, and an external liquid-inputting pipe for coolant input is connected to the inlet end of the cooling tube in the first interface chamber and an external liquid-draining pipe for coolant output is connected to the outlet end of the cooling tube in the second interface chamber.

Specifically, the first interface chamber and the second interface chamber are disposed respectively at both sides of the drainage port.

In an embodiment, the upper cover and the lower cover are detachably connected to the housing.

According to the above technical solutions, the disclosure at least provides the advantageous effects as follows: the drying and filtering device of the disclosure comprises housing, an upper cover, a lower cover and a cooling tube disposed in the cavity of the housing. Compressed air enters the cavity of the housing through the air inlet of the upper cover and contacts the cooling tube in the cavity, and then the saturated vapor in the compressed air condensates into liquid water, which falls to the lower cover by gravity and is drained through a drainage port of the lower cover. Whereas the compressed air dried by the cooling tube flows out from the air inlet of the upper cover. The compressed air directly contacts the cooling tube, so the drying and filtering device has good cooling effect, high drying efficiency, low energy consumption and can also filter condensed water.

DETAILED DESCRIPTION

Hereinafter, the disclosure will be explained in detail with reference to the accompanying drawings.

The disclosure provides a drying and filtering device which is mainly used for drying and filtering compressed air, and particularly suitable for filtering saturated vapor in high-temperature compressed air.

First Embodiment

Figure 1:
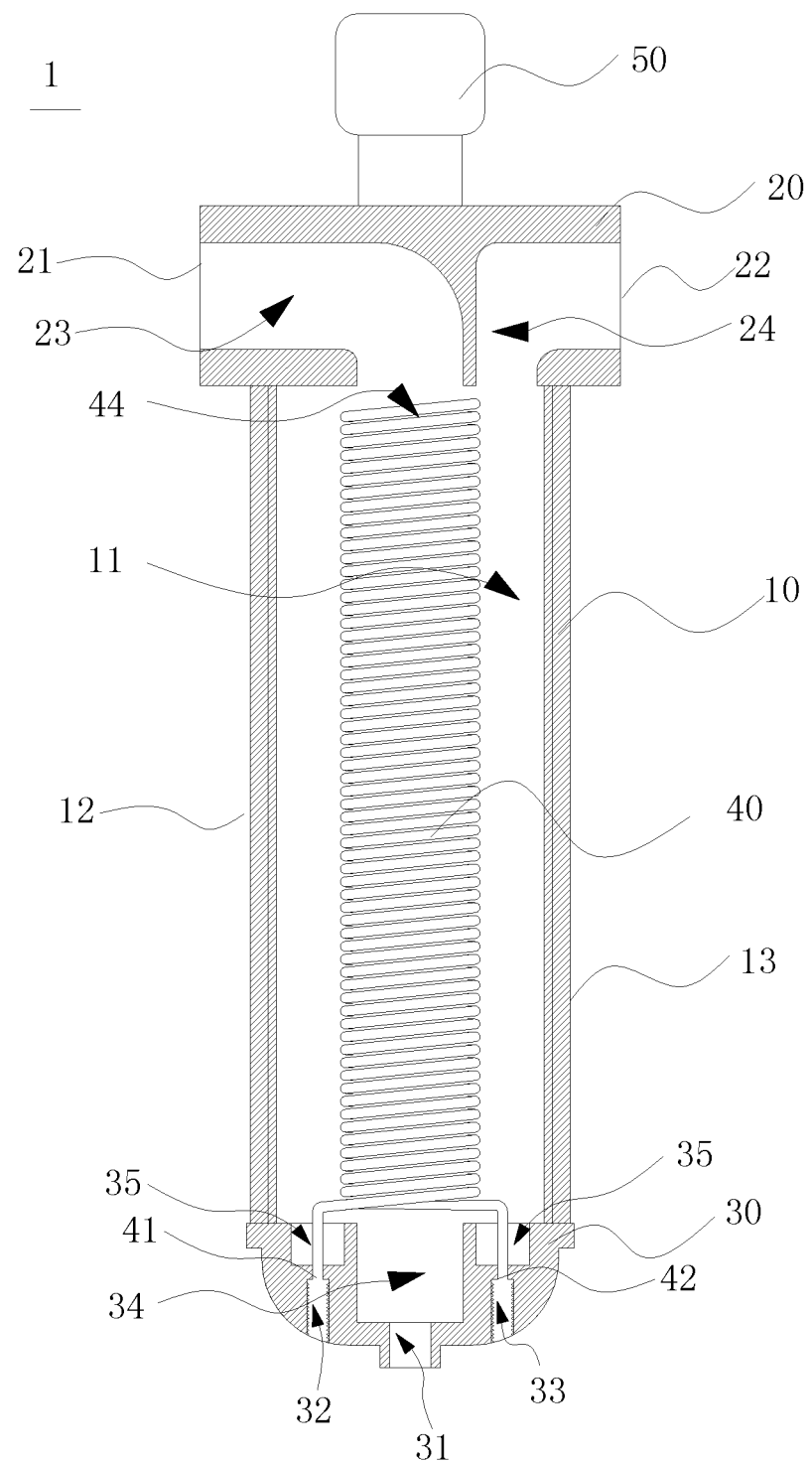
FIG. 1 is a schematic view of a drying and filtering device according to a first embodiment of the disclosure.

FIG. 1 is a schematic view of a drying and filtering device according to a first embodiment of the disclosure. The drying and filtering device 1 includes a housing 10, an upper cover 20 disposed on the roof of the housing 10, a lower cover 30 disposed at the bottom of the housing 10, and a cooling tube 40 disposed in the housing 10. The housing 10 has a cavity 11. The cooling tube 40 is disposed in the cavity 11, and the cooling tube 40 extends from a position near the upper cover 20 downward to the lower cover 30.

The cooling tube 40 is wound into a cylindrical helix tube, which has an inner cavity 44.

One side of the upper cover 20 is provided with an air inlet 21, the other side is provided with an air outlet 22, and both the air inlet 21 and the air outlet 22 are in communication with the cavity 11. The upper cover 20 is further provided with an air-inlet cavity 23 for communicating the cavity 11 of the housing 10 with the air inlet 21. Accordingly, the upper cover 20 is further provided with an air-outlet cavity 24 for communicating the cavity 11 of the housing 10 with the air outlet 22. The cylindrical helix tube is located at an intermediate portion of the cavity 11, the inner cavity 44 of which is aligned with the air-inlet cavity 23 for communicating each other.

The lower cover 30 is provided with a liquid storage chamber 34 located directly below the cylindrical helix tube for communicating the cavity 11. A drainage port 31 is located below the liquid storage chamber 34. The drainage port 31 communicates the cavity 11 through the liquid storage chamber 34. A drainage valve is disposed at the drainage port 31, which is used for regularly draining liquid water form the liquid storage cavity 34. The drainage valve may be disposed on the lower cover 30, or the drainage valve may be disposed on an external connecting pipe connected to the drainage port 31.

A first interface cavity 32 for accommodating an inlet end 41 of the cooling tube 40 and a second interface cavity 33 for accommodating an outlet end 42 of the cooling tube 40 are respectively disposed on the both sides of the drainage port 31. The inlet end 41 and the outlet end 42 of the cooling tube 40 extend directly from the cavity 11 into the first interface cavity 32 and the second interface cavity 33 respectively through openings 35 on both sides of the liquid storage chamber 34, so that a external liquid-inputting pipe for coolant input can be connected to the inlet end 41 of the cooling tube 40 in the first interface chamber 32 and the external liquid-draining pipe for coolant output can be connected to the outlet end 42 of the cooling tube 40 in the second interface chamber 33. The coolant may be a refrigerant, cooling water or cool air.

The cooling tube 40 is located in the cavity 11 of the housing 10 and between the upper cover 20 and the lower cover 30. Compressed air enters the cavity 11 of the housing 10 from the air inlet 21 of the upper cover 20 and contacts the cooling tube 40, resulting in that the temperature of the compressed air is decreased, and the saturated vapor in the compressed air condenses into liquid water, which is drained through the drainage port 31 by gravity, whereas dried compressed air flows out from the air outlet 22.

In addition, a differential pressure gauge 50 is disposed on the top of the drying and filtering device 1 for monitoring internal pressure of the drying and filtering device 1.

The upper cover 20 and the lower cover 30 are detachably mounted on the housing 10. Specifically, the upper cover 20 and the lower cover 30 may be connected to the housing 10 by bolts or tie rods.

In addition, the upper cover 20, the lower cover 30 and the housing 10 may also be integrally formed.

Second Embodiment

Figure 2:
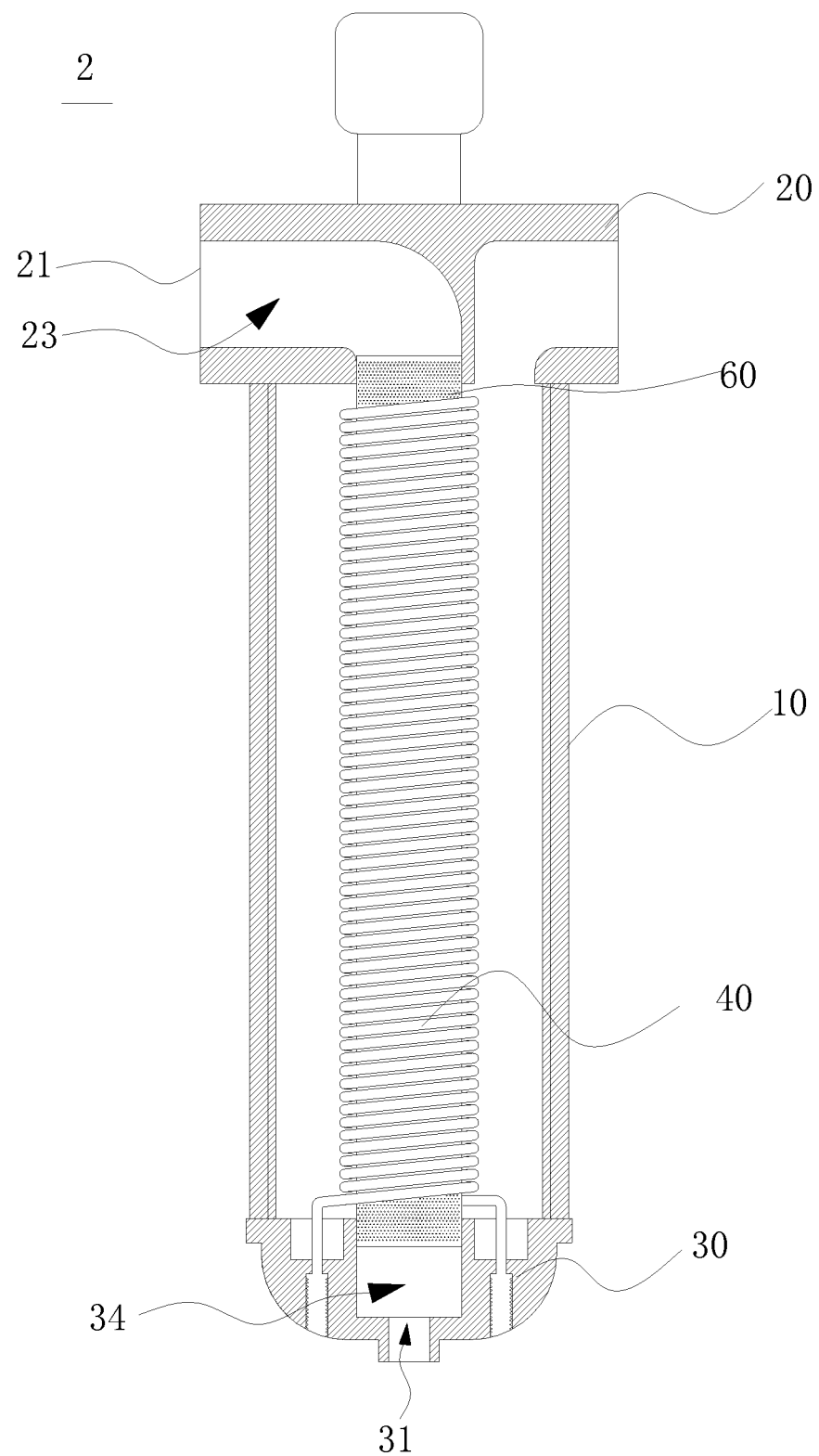
FIG. 2 is a schematic view of a drying and filtering device according to a second embodiment of the disclosure.

FIG. 2 is a schematic view of a drying and filtering device according to a second embodiment of the disclosure. The structure of the drying and filtering device 2 in the second embodiment is similar to that of the drying and filtering device 1 in the first embodiment. The main distinction between the first embodiment and the second embodiment is that: the drying and filtering device 2 of the second embodiment has a steel mesh, compared with the drying and filtering device 1 of the first embodiment. The distinction will be described below in detail, but the other structures that are the same as those in the first embodiment are not described herein again. The same reference numbers are used for the same structures in different embodiments.

The cooling tube 40 of the drying and filtering device 2 is wound into a cylindrical helix tube having an inner cavity 44, in which a steel mesh 60 is placed. The upper end of the steel mesh 60 extends into the air-inlet cavity 23, and the lower end extends into the liquid storage cavity 34. So that compressed air entering from the air inlet 21 of the upper cover 20, evenly diffuses through the steel mesh 60, guides the compressed air to flow downwards and makes most of the compressed air enter the inner cavity 44 of the cylindrical helix tube formed by the cooling tube 40. Thus the compressed air can fully contacts the cooling tube 40, thereby making the saturated vapor in the compressed air condense into liquid water, which is collected in the liquid storage chamber 34 by gravity, and then is drained through the drainage port 31.

The steel mesh 60 is a stainless steel mesh.

In addition, in this embodiment, the steel mesh 60 is disposed in the inner cavity 44 of the cooling tube 40, but the disclosure is not limited to this. A steel mesh may be provided at the outer periphery of the cooling tube 40, or the inner chamber 44 and the outer periphery of the cooling tube 40 are provided with a steel mesh respectively.

Third Embodiment

Figure 3:
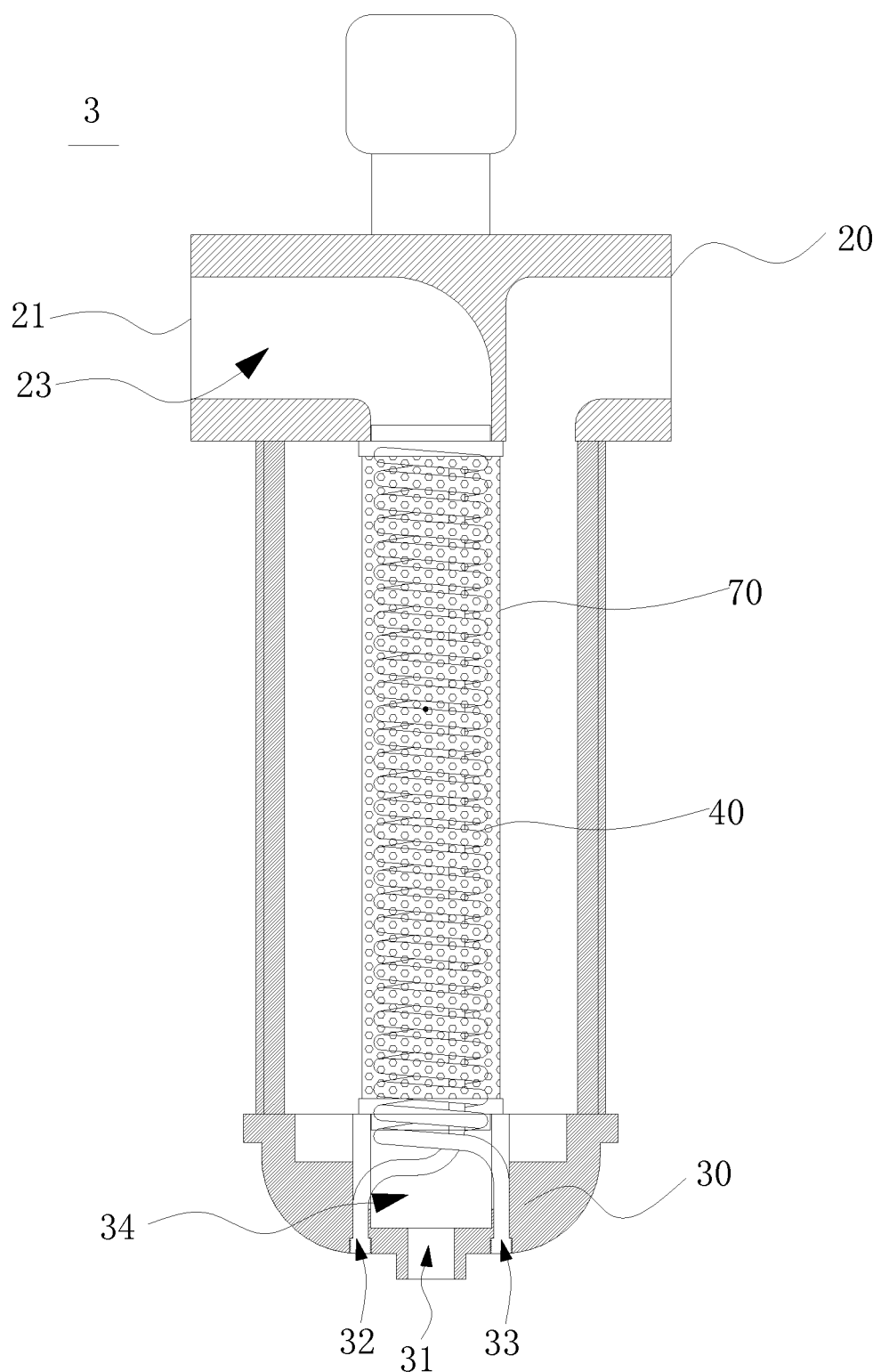
FIG. 3 is a schematic view of a drying and filtering device according to a third embodiment of the disclosure.

FIG. 3 is a schematic view of a drying and filtering device according to a third embodiment of the disclosure. The structure of the drying and filtering device 3 in the third embodiment is similar to that of the drying and filtering device 1 in the first embodiment. The main distinction between the first embodiment and the second embodiment is that: the drying and filtering device 3 of the third embodiment has a filter, compared with the drying and filtering device 1 of the first embodiment. The distinction will be described below in detail, but the other structures that are the same as those in the first embodiment are not described herein again. The same reference numbers are used for the same structures in different embodiments.

The cooling tube 40 of the drying filter device 3 is wound into a cylindrical helix tube, on the outer periphery of which a filter 70 is disposed. The filter 70 may be a stainless steel filter or a polyproylene cotton filter. The filter 70 is tubular and has openings on the surface thereof. The upper end of the filter 70 extends into the air inlet 23 of the upper cover 20 and the lower end of the filter 70 extends into the liquid storage chamber 34 of the lower cover 30 to guide the compressed air entering from the air inlet 23 to the inner cavity of the filter 70. The cooling tube 40 is sheathed in the filter 70 to make the filter 70 surround the cooling tube 40, so that the filter 70 blocks the compressed air entering from the air-inlet cavity 23 temporarily in the filter 70, which makes the compressed air fully contact the cooling tube 40, thereby the saturated vapor in the compressed air condenses into liquid water. The liquid water collected on the filter 70 falls to collect in the liquid storage chamber 34 by gravity, and then is drained through the drainage port 31.

In addition, in this embodiment, the cooling tube 40 extends into the liquid storage chamber 34, and the inlet end 41 and the outlet end 42 of the cooling tube 40 extending from the liquid storage chamber 34 into the first interface chamber 32 and the second interface cavity 33 of the lower cover 30 respectively. However, in the first embodiment, the inlet port 41 and the outlet port 42 of the cooling tube 40 extend directly from the cavity 11 of the housing 10 into the first interface chamber 32 and the second interface chamber 33 of the lower cover 30. Therefore, there are slight differences between the structure of the lower cover in this embodiment and the structure of the lower cover in the first embodiment. As mentioned above, the cooling tube 40 extends into the first interface cavity 32 and the second interface cavity 33 in different ways. That is, before the inlet end and the outlet end of the cooling tube 40 are connected to the first interface chamber and the second interface chamber, the first interface chamber and the second interface chamber in this embodiment are in communication with the cavity of the housing through the liquid storage chamber, however, the first interface chamber and the second interface chamber of the first embodiment are in communication with the cavity of the housing through openings on both sides of the liquid storage chamber. Although there are slight differences between the structure of the lower cover of this embodiment and that of the first embodiment, both of them are used for realizing the same function of respectively inserting the inlet end and the outlet end of the cooling tube into the first interface cavity and the second interface chamber. So the subtle changes belong to equivalent structural changes made with the spirit and principle of the specification and the drawings of the disclosure and are included in the protection scope of the disclosure.

The drying and filtering device of the disclosure comprises a housing, an upper cover, a lower cover and a cooling tube disposed in the cavity of the housing. Compressed air enters the cavity of the housing through the air inlet of the upper cover and contacts the cooling tube in the cavity, and then the saturated vapor in the compressed air condensates into liquid water, which falls to the lower cover by gravity and is drained through a drainage port of the lower cover. Whereas the compressed air dried by the cooling tube flows out from the air inlet of the upper cover. The compressed air directly contacts the cooling tube, so the drying and filtering device has good cooling effect, high drying efficiency, low energy consumption and can filter condensed water.

In addition, the drying and filtering device of the disclosure is a simple structure, which is different form the conventional refrigeration dryer that is complex and needs to consume a certain amount of electrical energy during working. The drying and filtering device of the disclosure is very low energy consumption. If there is coolant available in the vicinity of the drying and filtering device, the coolant may be directly introduced into the cooling tube of the drying and filtering device when the drying and filtering device of the disclosure needs to work, which is very convenient and environmentally friendly.

In addition, the drying and filtering device of the disclosure adds a steel mesh in the inner cavity of the cooling tube, so that the compressed air can be evenly diffused and full contact the cooling tube to achieve better drying and filtering effects.

In addition, the filter surrounds the cooling tube at the outer periphery of the condensing tube, so that the compressed air can fully contact the cooling tube to further achieve better drying and filtering effects.

The above described embodiments should not limit the scope of protection of the technical solutions. All modifications, substitutions and improvements made without departing from the spirit and principle of the above embodiments should be embraced by the appended claims.

What is claimed is:

1. A drying and filtering device, used for drying and filtering compressed air, comprising: a housing, having a cavity; an upper cover, disposed on the roof of the housing, one side of which is provided with an air inlet, the other side of which is provided with an air outlet; a lower cover, disposed at the bottom of the housing, and being provided with a drainage port; and a cooling tube, disposed in the housing; wherein the cavity is in communication with the air inlet, the air outlet and the drainage port respectively, and the cooling tube is in the cavity and extends from a position near the upper cover downward to the lower cover; and wherein the cooling tube is wound into a cylindrical helix tube which has an inner cavity; compressed air enters the cavity from the air inlet of the upper cover, and contacts the cooling tube in the inner cavity of the cylindrical helix tube, so that the temperature of the compressed air decreases, and saturated vapor in the compressed air condenses to liquid water, which is drained through the drainage port by gravity, and dried compressed air outflows from the air outlet; wherein the upper cover is provided with an air-inlet cavity for communicating the cavity with the air inlet, and the inner cavity of the cylindrical helix tube is aligned with the air-inlet cavity for communicating with each other.

2. The drying and filtering device according to claim 1, wherein a steel mesh is placed in the inner cavity of the cylindrical helix tube, and the compressed air is evenly diffused through the steel mesh;
wherein the compressed air diffuses through the steel mesh, guides the compressed air to flow downwards and makes most of the compressed air enter the inner cavity of the cylindrical helix tube formed by the cooling tube.

3. The drying and filtering device according to claim 2, wherein the upper cover is provided with an air-outlet cavity for communicating the cavity with the air outlet; wherein the cylindrical helix tube is located at an intermediate portion of the cavity, and the cavity is in communication with the air-outlet cavity.

4. The drying and filtering device according to claim 3, wherein the lower cover is provided with a liquid storage chamber, which is located directly below the cylindrical helix tube, and the drainage port is located below the liquid storage chamber.

5. The drying and filtering device according to claim 4, wherein the upper end of the steel mesh extends into the air-inlet cavity, and the lower end of the steel mesh extends into the liquid storage cavity.

6. The drying and filtering device according to claim 4, wherein a drainage valve is disposed at the drainage port, which is used for regularly draining liquid water from the liquid storage cavity.

7. The drying and filtering device according to claim 1, wherein a filter is located at the outer periphery of the cooling tube, which is tubular and surrounds the cooling tube, the surface of which is provided with openings.

8. The drying and filtering device according to claim 1, wherein the lower cover is further provided with a first interface cavity for accommodating an inlet end of the cooling tube and a second interface cavity for accommodating an outlet end of the cooling tube, and an external liquid-inputting pipe for coolant input is connected to the inlet end of the cooling tube in the first interface chamber and an external liquid-draining pipe for coolant output is connected to the outlet end of the cooling tube in the second interface chamber.

9. The drying and filtering device according to claim 8, the first interface chamber and the second interface chamber are disposed respectively at both sides of the drainage port.

10. The drying and filtering device according to claim 1, the upper cover and the lower cover are detachably connected to the housing.

* * * * *